US005638739A

United States Patent [19]
Shaanan et al.

[11] Patent Number: 5,638,739
[45] Date of Patent: Jun. 17, 1997

[54] BREWER

[75] Inventors: Gad Shaanan, Montreal; Walter Francovich, Pierrefonds, both of Canada

[73] Assignee: Shaanan Holdings Inc., Quebec, Canada

[21] Appl. No.: 676,410

[22] Filed: Jul. 8, 1996

[51] Int. Cl.[6] .................................................. A47J 31/32
[52] U.S. Cl. ........................ 99/287; 99/289 R; 99/302 P
[58] Field of Search .............................. 99/289 R, 287, 99/289 T, 289 P, 289 D, 316, 317, 319, 320, 279, 297, 300, 302 R, 302 P; 426/433

[56] References Cited

U.S. PATENT DOCUMENTS

| 4,457,216 | 7/1984 | Dremmel | 99/287 |
| 5,349,897 | 9/1994 | King | 99/289 R |
| 5,351,604 | 10/1994 | King | 99/289 R |
| 5,406,882 | 4/1995 | Shaanan | |

Primary Examiner—Robert W. Jenkins

[57] ABSTRACT

A coffee brewer of the type having an outer fixed cylindrical tube and a fixed piston within the tube. A sliding cylinder slides in sealing contact between the outer cylinder and the piston. The sliding cylinder has a filter at the top thereof. A frame mounts the piston head and the outer cylindrical tube, and motor means are mounted on the frame with a pair of rotors rotatably mounted on the frame, one on either side of the outer cylindrical tube about a lateral axis at right angles to the axial axis of the outer and sliding cylindrical tubes. Each rotor includes an arcuate segment with gear teeth on the periphery thereof. Gear means connect the motor to the rotors for rotating the rotors, and a cam connector connects the sliding cylinder to the rotors for sliding movement of the sliding cylindrical tube during the brewing cycle. A spring mounted sweeper blade extends between a pair of arms, one on either side of the outer cylindrical tube, for sweeping the top of the sliding cylindrical tube and, therefore, the filter. A pour spout is mounted on the frame and is connected to a flexible tube communicating with the sliding cylinder for pouring the coffee from the interior of the sliding cylinder when the appropriate position is reached in the brewing cycle.

6 Claims, 4 Drawing Sheets

BREWER

BACKGROUND OF THE INVENTION

1. Field of the Invention

The present invention relates to brewers, and more particularly, to a brewer for making a single cup of beverage from infusible alimentary material.

The present invention is an improvement over U.S. Pat. No. 5,406,882, issued Apr. 18, 1995.

2. Description of the Prior Art

The brewer described in U.S. Pat. No. 5,406,882 is dependent on the mechanical efficiency of several parts. For instance, sliding movement of the tube 20 depends on the driven threaded shaft 32 and threaded collar 42. The wiper blade 64 is loaded by the spiral rod 74. The wiper is a swinging arm exhibiting different velocities across the area to be cleaned of grounds. Some of these mechanical elements and their interrelation have been found lacking and are susceptible to relatively high maintenance costs.

SUMMARY OF THE INVENTION

It is an aim of the present invention to provide an improved mechanical construction for a brewer of the type described in U.S. Pat. No. 5,406,882.

It is a further aim of the present invention to provide an integrated balanced drive mechanism for both the tube 20 and the wiper blade 64.

It is a still further aim of the present invention to provide an improved wiper blade mechanism that will more thoroughly and consistently clean off the permanent filter screen bearing the waste grounds.

It is still a further aim of the present invention to provide an improved pouring spout for the purpose of dispensing a single cup of infusion liquid.

A construction in accordance with the present invention includes a brewer comprising a first upright cylindrical tube having an upper portion with a smooth inner surface and an open top, a second cylindrical tube slidable within the first cylindrical tube in a reciprocating travel cycle along an axial axis of the first and second cylindrical tubes, and including a filter means at the top of the second cylindrical tube and a gasket means between the first and second cylindrical tubes to ensure sealing contact between the sliding first and second cylindrical tubes; the uppermost position of the second cylindrical tube in the travel cycle occurring when the filter means is flush with the top of the first cylindrical tube, a piston head stationary within the second cylindrical tube, and gasket means being provided between the second cylindrical tube and the piston to ensure sealing contact therebetween, and a pour spout outlet means in the second cylindrical tube located in the tube below the top of the piston head for most of the travel of the second cylindrical tube but above the piston head in the uppermost segment of the travel cycle of the second cylindrical tube, the improvement comprising a frame for mounting the piston head and the first cylindrical tube, motor means mounted on the frame, a pair of rotors rotatably mounted on the frame, one on either side of the first and second cylindrical tubes, about a lateral axis at a right angle to the axial axis of the first and second cylindrical tubes, each rotor including an arcuate segment with gear teeth on the periphery of the arcuate segment, gear means connecting the motor means to the rotors for rotating the rotors, and means connecting the rotors to the second cylindrical tube for effecting the reciprocating vertical travel cycle to the second cylindrical tube.

In a more specific embodiment of the present invention, the means connecting the second cylindrical tube to the rotors includes at least a linear cam track on one side of the second cylindrical tube adjacent and parallel to one of the rotors, and a cam follower means is mounted to the rotor and engages the at least one cam track on the second cylindrical tube.

In another aspect of the present invention, a pair of wiper arms is pivotally mounted on the lateral axis, one on opposite diametrical positions relative to the first and second cylindrical tubes, the wiper arms extending above the open top of the first cylindrical tube and subtending a wiper blade for scraping waste grounds from the filter when the second cylindrical tube has reached the uppermost position of the travel cycle, and means associated with the second cylindrical tube for loading the wiper arms against spring means when the second cylindrical tube is moving from the uppermost position towards the piston head.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
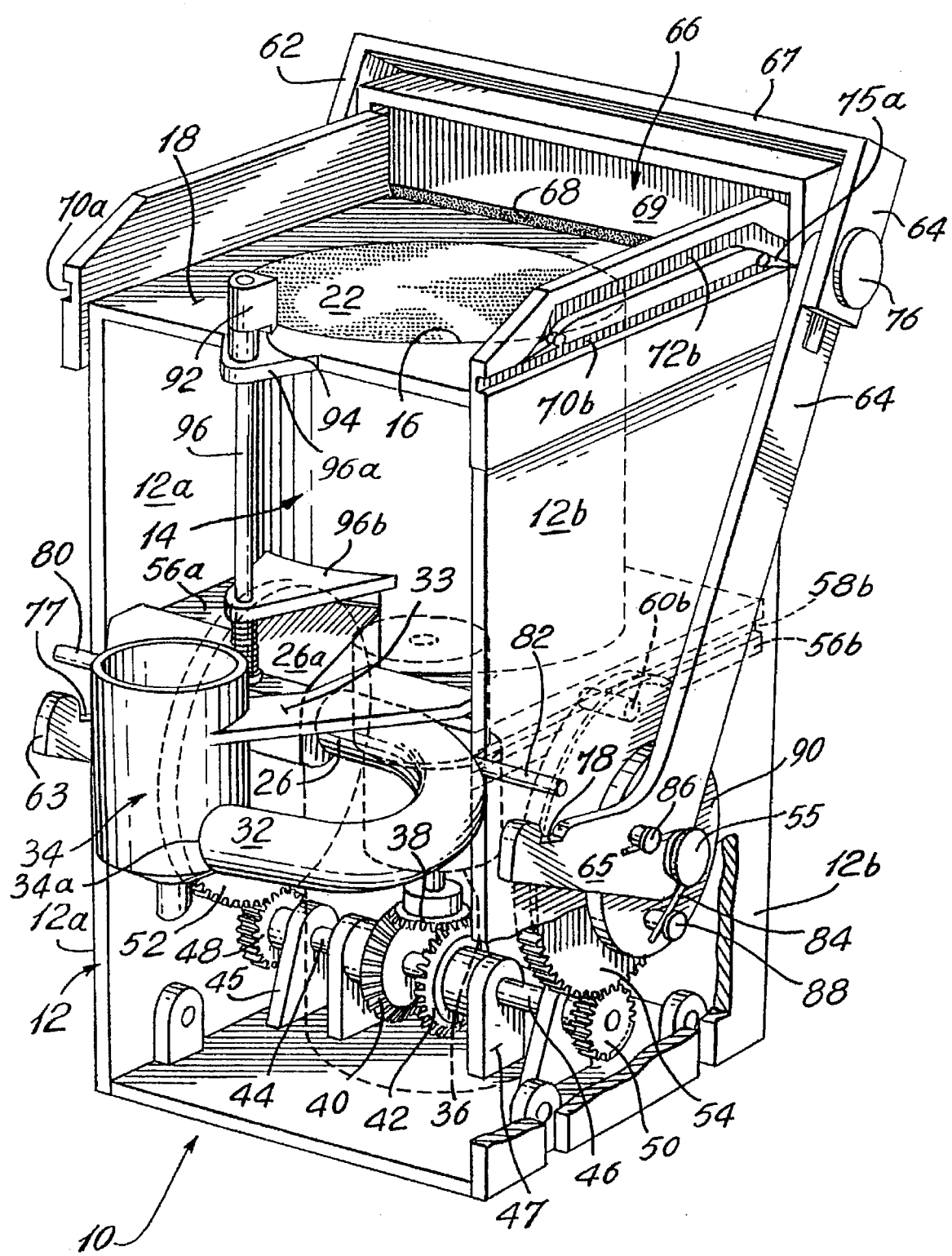
FIG. 1 is a perspective view of a brewer in accordance with the present invention.

Referring now to the drawings, there is shown a brewer 10 having a housing 12 with side walls 12a and 12b. An outer cylindrical tube 14 is mounted to the housing 12 and defines an opening 16 in the top platform 18 of the housing.

Figure 4:
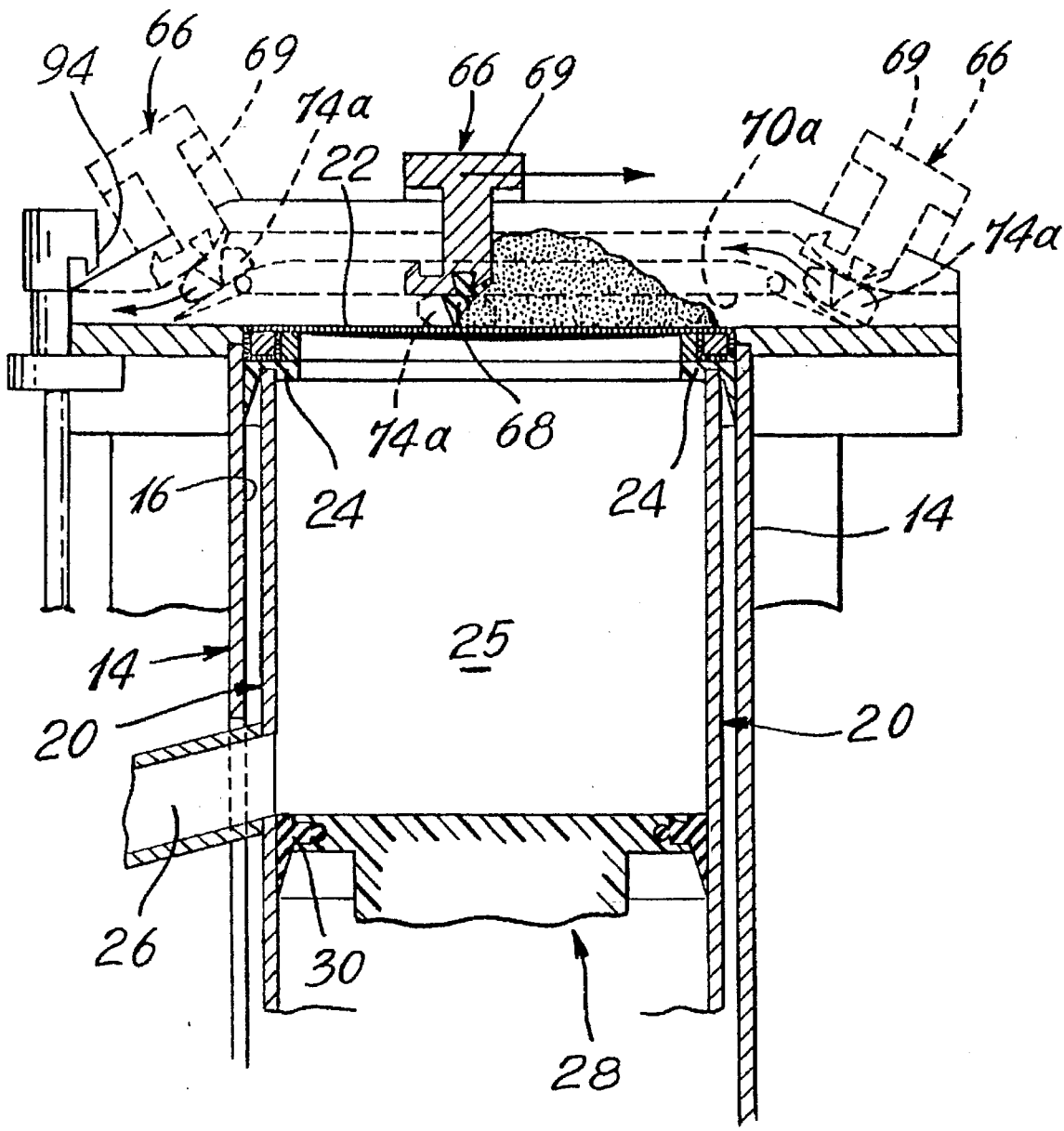
FIG. 4 is a fragmentary vertical cross-section of the brewer.

An inner cylindrical tube 20 is adapted to slide within the cylindrical tube 14, as shown in FIG. 4. The top of the inner cylindrical tube 20 has a permanent filter screen 22. The top surface of the filter screen 22 is flush with the top of the tube 20 when the tube 20 is in its uppermost position, and the filter screen 22 is flush with the top surface of the platform 18.

A gasket 24, as shown in FIG. 4, is mounted to the top edge of the cylindrical tube 20 and engages the inner smooth surface of the cylindrical tube 14 in order to be in sealing contact therewith. The wall of the tube 20 is provided with a spout outlet 26. A piston head 28 is provided internally of the tube 20 and is fixed to the housing 12. A gasket 30 is mounted to the edge of the piston head 28 and is in sealing contact with the inner surface of the tube 20.

The operation of the brewer is similar to that described in applicant's U.S. Pat. No. 5,406,882, issued Apr. 18, 1995, which is incorporated herein by reference.

The outlet 26 for the spout is movable with the tube wall 20. A dispensing spout and reservoir 34 is mounted by means of support 33 to the housing 12 and is fixed in relation thereto. A flexible conduit 32 communicates the movable outlet 26 to an inlet 34a on spout reservoir 34. The outlet 26 is located on the wall of the tube 20 in the lower portion thereof so that during the travel of the inner cylindrical tube 20, the outlet 26 is below the piston head 28 and, therefore, not in communication with the coffee being brewed within the chamber 25 formed by the piston head 28, the tube 14, and the tube 20. However, when the coffee has been brewed in the chamber 25 and the tube 20 rises to its uppermost position, the outlet 26 will rise above the level of the piston head 28, thereby communicating with the coffee in the chamber, as shown in FIG. 4, allowing the coffee to pass through the flexible conduit 32 into the reservoir and spout 34 so that the coffee may be dispensed into a cup placed below the spout 34.

A motor 36, as seen in dotted lines in FIG. 1, is mounted centrally of the housing 12 and below the piston head 28. The motor 36 rotates a beveled gear 38 which meshes with a pair of opposed bevel gears 40 and 42. These bevel gears 40 and 42 are connected to shafts 44 and 46 which are journaled in supports 45 and 47 respectively. Ring gear 48 is mounted at the end of shaft 44, and ring gear 50 is mounted to the end of shaft 46. A pair of rotors 52 and 54 are journaled to the housing 12 with rotor 52 being mounted for rotation on the inside of housing wall 12a and rotor 54 being mounted on the inside of housing wall 12b. Rotor 54 rotates about a common lateral axis on stub shaft 55. Rotors 52 and 54 have gear teeth on the periphery of each rotor that mesh with ring gears 48 and 50 respectively.

Thus, in view of the gear train just described, rotor 52 will rotate, for instance, in a clockwise rotation while rotor 54 will rotate in a counterclockwise position since the gear 38 will cause bevel gears 40 and 42 to rotate in opposite directions.

Figure 2:
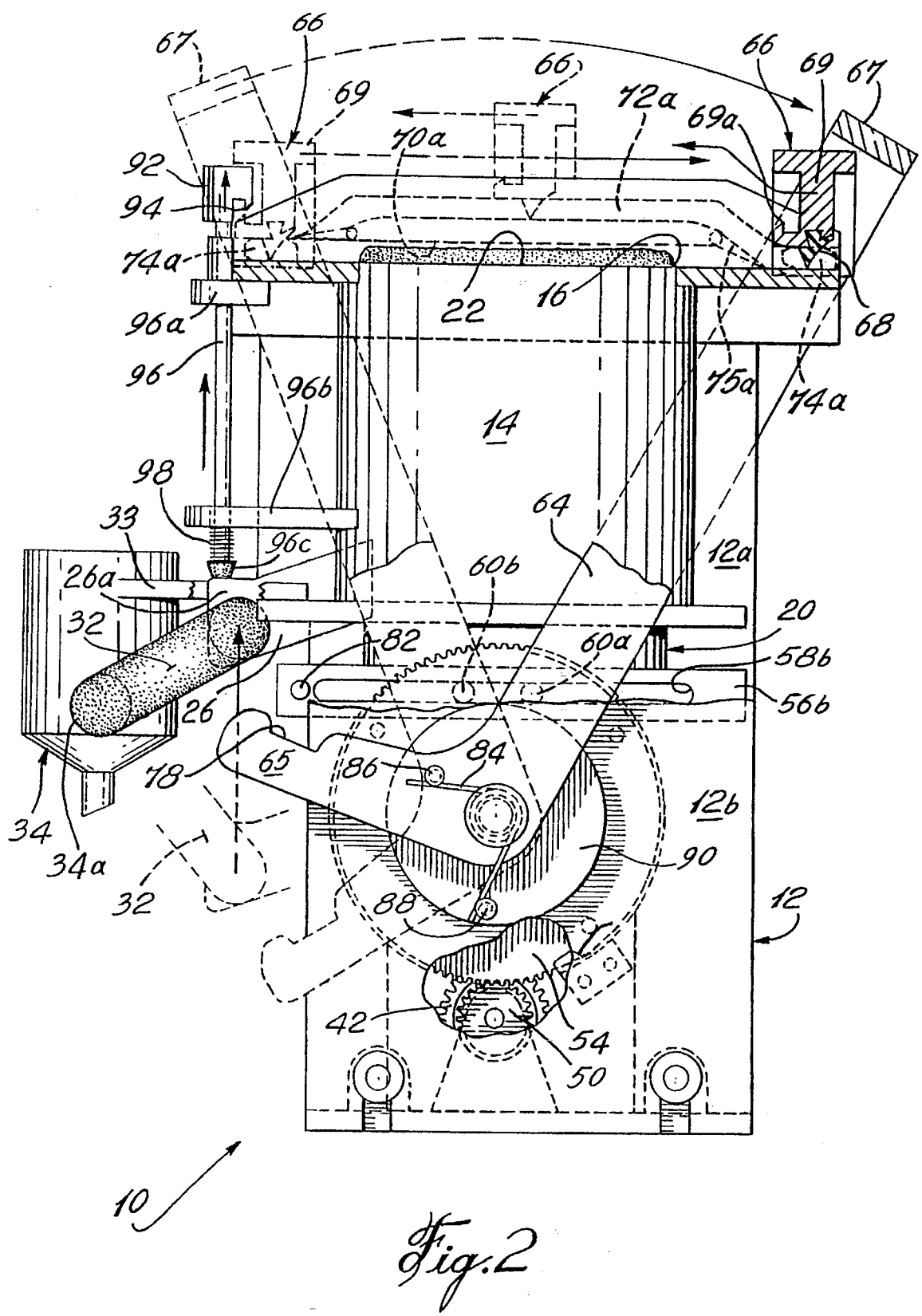
FIG. 2 is a side elevation, partly cut away, of the brewer shown in FIG. 1.
Figure 3:
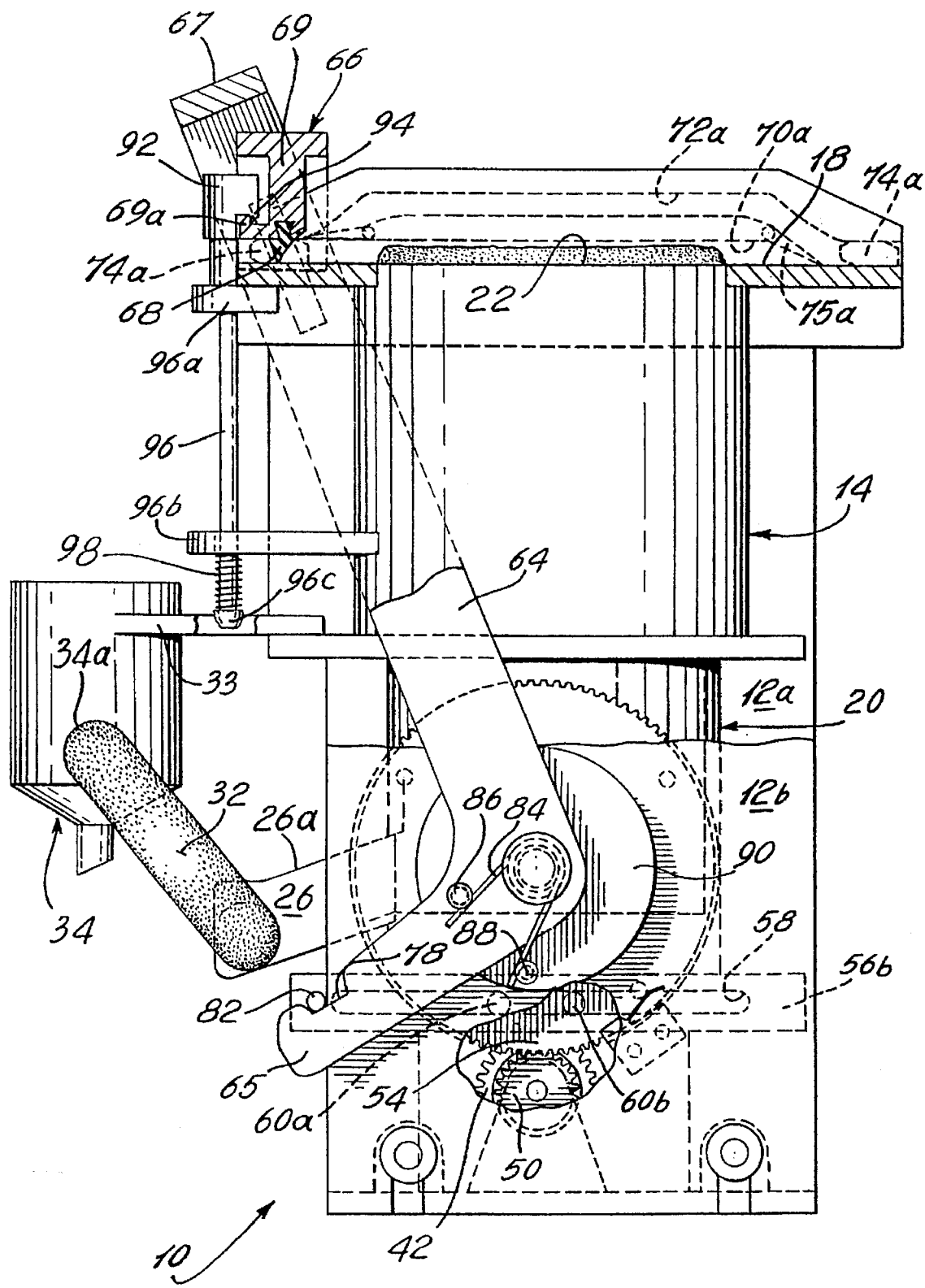
FIG. 3 is a side elevation, partly cut away, similar to FIG. 2 but showing a detail thereof in a different operative position.

The inner cylindrical tube 20 is provided with flanges 56a and 56b that extend on either diametrically opposite portions thereof adjacent the rotors 52 and 54 respectively. The flanges 56a and 56b define linear cam tracks such as cam track 58b in flange 56b. Rotor 54 has a cam follower 60b which extends into cam track 58b, as shown in FIGS. 1, 2, and 3. Rotor 52 is provided with cam follower 60a that would similarly engage cam track 58a (not shown).

Thus, as the rotors 52 and 54 are driven by the respective gear trains, the cam followers 60a and 60b will entrain the flanges 56a and 56b, in unison, by the fact that they are captive in the cam tracks 58a, 58b. Flanges 56a and 56b will cause the inner cylindrical tube 20 to reciprocate along an axial vertical axis from an uppermost position with the screen 22 flush to the top surface of the platform 18 and a lowermost position adjacent the piston head 28.

A pair of wiper arms 62 and 64 connected by a bridge 67 are each mounted for rotation on the lateral axis represented by the stub shaft 55. The wiper arms 62 and 64 rotate independently of the rotors 52 and 54. The wiper arms mount the blade assembly 66. Each wiper arm 62 and 64 has a respective dogleg portion 63 and 65. Dogleg 63 includes a notch 77 while dogleg 65 has a notch 78. Flanges 56a and 56b each include a projecting pin 80 and 82 which are adapted to engage the notches 77 and 78 of doglegs 63 and 65 respectively. Thus, when the inner tube 20 and flanges 56a and 56b move in unison from the uppermost position in the travel cycle of the tube 20 downwardly towards the piston head 28, the pins 80 and 82, in their downward descent, engage the notches 77 and 78 of the doglegs 63 and 65 respectively to cause the wiper arms 62 and 64 to rotate in a counterclockwise direction, as shown in FIGS. 2 and 3, to thereby return the wiper assembly 66 to its loaded position against spring 84. Spring 84 is on the stub shaft 55 between a stopper 86 on arm 64 and a stopper 88 located on disc 90. Disc 90 is fixed to wall 12b.

The wiper assembly 66 includes a blade support element 69 with a catch 69a adapted to be engaged by a locking device 92 having a hook 94. Locking device 92 is mounted to the end of a rod 96 adapted to slide in supports 96a and 96b mounted to the housing 12. The end of the rod 96c is engaged by a spring 98. The locking device 92 and hook 94 are adapted to engage the catch 69a when the wiper assembly 66 is loaded. However, when the tube 20 moves towards its upward position, the top of housing 26a of outlet 26 will abut the end 96c of the rod 96, at the moment that the filter 22 reaches the level of the platform 18, to release the wiper assembly 66, as will be described.

The housing walls 12a and 12b have upward extensions which define cam tracks 70a, 70b, and 72a, 72b. The wiper assembly 66 is provided with cam followers 74a and 74b on either side thereof to engage the tracks 70a, 70b, 72a, and 72b, as will be described. A diverter gate 75a and 75b is located between the tracks 70a, 72a, and 70b, 72b.

When the pins 80 and 82 cause the wiper arms 62 and 64 to be loaded against spring 84, the locking device 92 engages the wiper assembly 66 by means of the hook 94 coming into contact and engaging the catch 69a on the wiper assembly 66. During this loading operation, the cam followers 74a and 74b pass in the upper cam tracks 72a and 72b by means of the diverter gate 75a and 75b. Thus, the wiper blade 68 passes over the fresh coffee grounds which might be located on the screen 22 and the tube 20 moves downwardly.

When the tube 20 moves upwardly in its return stroke as a result of the rotors and the cam followers 60a and 60b causing the tube 20 and its appendages to move upwardly, the housing 26a of the outlet 26 will continue its upward path with the tube 20 until the filter 22, bearing the waste grounds, reaches the level of the platform 18. At that moment, the housing 26c will engage the end 96c of rod 96, pressing the rod against the spring 98 causing the hook 94 to release the catch 69a. The wiper arms 62 and 64 are then released to rotate clockwise under the urging of the spring 84. However, the cam followers 74a and 74b are engaged at that moment with the cam track 70a and 70b, that is, the lower position, and the wiper blade 68 will cross the filter 22, sweeping the grounds from this filter and dispose of the grounds (not shown).

The rotors 52 and 54 with the cam followers 60a and 60b immediately cause the inner tube 20 to start its downward leg of its reciprocating cycle, and the cycle will be repeated with the pins 80 and 82 engaging the doglegs 63 and 65 to load the wiper arms 62 and 64.

I claim:

1. A brewer comprising a frame, a first upright cylindrical tube mounted to the frame and having an upper portion with a smooth inner surface and an open top, a second cylindrical tube slidable within the first cylindrical tube in a reciprocating travel cycle along an axial axis of the first and second cylindrical tubes, the second cylindrical tube including a filter means at the top thereof, gasket means provided between the first and second cylindrical tubes to ensure sealing contact between the sliding first and second tubes, the uppermost position of the second cylindrical tube in the travel cycle occurring when the filter means is flush with the top of the first cylindrical tube, a piston head mounted to the frame within the second cylindrical tube and gasket means provided between the second cylindrical tube and the piston head to ensure sealing contact therebetween, a pour spout outlet means in the second cylindrical tube located below the top of the piston head for most of the travel of the second cylindrical tube but above the piston head in the uppermost segment of the travel cycle of the second cylindrical tube, the improvement comprising motor means mounted on the frame, a pair of rotors rotatably mounted on the frame, one on either diametrically opposite positions of the first and second cylindrical tubes about a lateral axis at right angles to the axial axis of the first and second cylindrical tubes, each rotor including an arcuate segment with gear teeth on the periphery of the arcuate segment, gear means connecting the motor means to the rotors for rotating the rotors, and means connecting the rotors to the second cylindrical tube for effecting the reciprocating vertical travel cycle to the second cylindrical tube.

2. The brewer in accordance with claim 1, wherein the means connecting the second cylindrical tube to the rotors includes at least a linear cam track on one side of the second cylindrical tube adjacent and parallel to one of the rotors, and a cam follower means mounted on the rotor to engage the at least one cam track on the second cylindrical tube.

3. The rotor as defined in claim 2, wherein there is a linear cam track provided on opposite diametrical portions of the second cylindrical tube with each cam track adjacent each of the rotors, and each of the rotors includes a cam follower means to engage the respective cam tracks.

4. The brewer as defined in claim 1, wherein a pour spout outlet is defined in the second cylindrical tube, whereby the outlet will be located below the piston head and thereby out of communication with the liquid in a chamber formed by the piston head and the first and second cylindrical tube, but the location of the outlet for the spout means will move above the piston head when the second cylindrical tube moves towards its uppermost position whereby the outlet will be in communication with the liquid in the chamber, the pour spout including a spout dispenser member fixed to the frame and including an inlet which is at the same level as the piston head and a flexible conduit extending between the outlet on the second cylindrical tube and the inlet on the spout dispenser member so that when the outlet is in communication with the liquid in the chamber, the liquid will flow through the flexible conduit into the spout dispenser member.

5. A brewer as defined in claim 1, wherein a pair of wiper arms are pivoted to the housing for rotation about the lateral axis and the wiper arms include doglegs and the second cylindrical tube includes engagement means for engaging the doglegs when the second cylindrical tube is moving in its downward travel and thereby rotating the wiper arms to be loaded against a spring extending between the housing and the wiper arms and locking means for releasably locking the wiper arms in the loaded position, the wiper arms subtending a wiper assembly including a wiper blade for sweeping the waste grounds from the filter when the second cylindrical tube is at its uppermost position with the filter level with the top of the opening.

6. The brewer as defined in claim 5, wherein the housing includes a pair of parallel opposed side walls extending parallel to the axial axis of the first and second cylindrical tubes and at right angles to the lateral axis, the walls having upper portions projecting above the top of the first tube, the upper portions each including a first cam track and the wiper assembly including wiper cam followers connected at each end to the wiper blade, and when the wiper arms are released from their loaded position, the spring urges the wiper arms and the wiper blade across the screen when the second cylindrical tube is in its uppermost position, whereby the wiper cam followers follow the first cam track forcing the wiper blade to sweep the screen and to be in contact with the screen, the upper portions each including a second cam track above the first cam track and a diverting gate means for diverting the wiper cam followers to travel in the second cam track when the wiper arms are being retracted towards a loading position such that the wiper blade is moved out of contact with the filter by means of the cam followers following in the second cam track.

\* \* \* \* \*